(12) United States Patent
Andrie (10) Patent No.: US 7,975,533 B2
(45) Date of Patent: Jul. 12, 2011

(54) SYSTEM AND METHOD FOR MONITORING COMBUSTION CHAMBER PRESSURE AND CONTROL SYSTEM USING THE SAME

(75) Inventor: Michael John Andrie, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 369 days.

(21) Appl. No.: 12/130,350

(22) Filed: May 30, 2008

(65) Prior Publication Data

US 2009/0293597 A1    Dec. 3, 2009

(51) Int. Cl.
*G01M 15/08* (2006.01)
(52) U.S. Cl. .................................. 73/114.16; 73/114.18
(58) Field of Classification Search ................ 73/114.16, 73/114.17, 114.18, 114.22
See application file for complete search history.

(56) References Cited

U.S. PATENT DOCUMENTS

| | | | |
|---|---|---|---|
| 4,672,843 | A | 6/1987 | Pozniak |
| 5,001,435 | A | 3/1991 | Smith |
| 6,390,039 | B2 | 5/2002 | Fuwa |
| 2007/0089697 | A1 | 4/2007 | Hara et al. |

OTHER PUBLICATIONS

Miyamoto, Noboru & Murayama, Tadashi, Unique Measuring Method of Indicator Diagrams Using Strain History of Head Bolts, New Diesel Engines, Combustion, and Emissions Research in Japan, Sep. 1980, 14 pages, SP-468, Society of Automotive Engineers, Inc., Warrendale, PA.
Author Unknown, BERU AG, Future potential: PSG pressure sensor glow plug from BERU facilitates optimum combustion, http://www.beru.com/english/aktuelles/presse/20080131-PI274.php, Jan. 31, 2008, 2 pages.
Author Unknown, Multi-VIT multi-purpose position sensing, KAMAN NonContact Position Measuring Systems, 4 pages, 2000 Kaman Corporation, USA.

*Primary Examiner* — Eric S McCall
(74) *Attorney, Agent, or Firm* — Armstrong Teasdale LLP (57) ABSTRACT

In a monitoring system and method for monitoring pressure in a combustion chamber of an internal combustion engine, a sensor is operable to sense movement of a valve while the valve is in its closed position. The sensor generates data indicative of the sensed movement of the valve. A control system is in communication with the sensor to receive the data indicative of the sensed movement of the valve in the closed position thereof. The control system is operable to determine the pressure in the combustion chamber based at least in part on the sensed movement of the valve. In other aspects, operation of the engine is adjusted based at least in part on the determined pressure in the combustion chamber.

28 Claims, 9 Drawing Sheets

SYSTEM AND METHOD FOR MONITORING COMBUSTION CHAMBER PRESSURE AND CONTROL SYSTEM USING THE SAME

BACKGROUND

The present disclosure is directed to combustion engines and more particularly to systems and methods for determining the pressure in the combustion chamber of such an engine, and control systems that utilize this determined pressure to control, at least in part, operation of such an engine.

The development of advanced engine control systems is being increasingly driven by the need for more efficient engine operation, increased fuel economy and stringent exhaust emission standards. For example, diesel engine manufacturers are investigating ways to eliminate and reduce carbon dioxide and NOx emissions. Some current approaches include the use of after-treatment (e.g., after combustion) devices, such as lean NOx traps, diesel oxidation catalysts and diesel particulate filters. Though effective for reducing emissions, after-treatment devices require engine manufacturers to incorporate additional components, thereby increasing cost and in some instances reducing fuel efficiency.

To this end, other recent advancements in engine control systems have focused on using combustion chamber pressure (e.g., cylinder pressure) as a primary feedback variable. In such systems, a pressure sensing device is exposed to the combustion chamber (often referred to as an intrusive chamber pressure sensor) to sense pressure in the combustion chamber during operation of the engine. Combustion chamber pressure is known to be useful in characterizing the combustion process and can be used for feedback control of multiple operating parameters that effect engine operation, including without limitation the air-fuel ratio, exhaust gas recirculation, spark-plug timing, injection timing, valvetrain timing, etc.

Generally, however, the cost of implementing an intrusive pressure sensor system into the crowded space of an engine cylinder head has limited the acceptance of such a system. Additionally, the extreme thermal environment within a combustion chamber raises durability concerns for intrusive pressure sensors.

There is a need, therefore, for a combustion chamber pressure monitoring system that is non-intrusive and thus unexposed to the extreme thermal environments present in the combustion chamber. A need also exists for such a monitoring system that requires relatively few additional (and more cost effective) components to be added to the engine, and for engine control systems that utilize such a monitoring system.

SUMMARY

In one aspect, a monitoring system for monitoring pressure in a combustion chamber of an internal combustion engine generally comprises a sensor operable to sense movement of a valve while the valve is in its closed position. The sensor generates data indicative of the sensed movement of the valve. A control system is in communication with the sensor to receive the data indicative of the sensed movement of the valve in the closed position thereof. The control system is operable to determine the pressure in the combustion chamber based at least in part on the sensed movement of the valve.

In another aspect, a control system for controlling operation of an internal combustion engine generally comprises a valve sensor operable to sense movement of the valve while the valve is in its closed position. The sensor generates data indicative of the sensed movement of the valve. A control system is in communication with the sensor to receive the data indicative of the sensed movement of the valve in the closed position thereof. The control system is operable to determine the pressure in the combustion chamber based at least in part on the sensed movement of the valve, and is further operable to adjust operation of the engine based at least in part on the determined pressure in the combustion chamber.

In one aspect of a method for determining the pressure in the combustion chamber of an internal combustion engine, movement of the valve is sensed while the valve is in its closed position. The pressure in the combustion chamber is then determined based at least in part on the sensed movement of the valve.

In another aspect, a method for controlling operation of an internal combustion engine generally comprises sensing movement of the valve while the valve is in its closed position. The pressure in the combustion chamber is then determined based at least in part on the sensed movement of the valve. At least one operating parameter of the engine is adjusted based at least in part on the determined pressure in the combustion chamber.

Other features of the invention will be in part apparent and in part pointed out hereinafter.

BRIEF DESCRIPTION OF DRAWINGS

Corresponding reference characters indicate corresponding parts throughout the several views of the drawings.

DETAILED DESCRIPTION OF THE EXEMPLARY EMBODIMENTS

Figure 1:
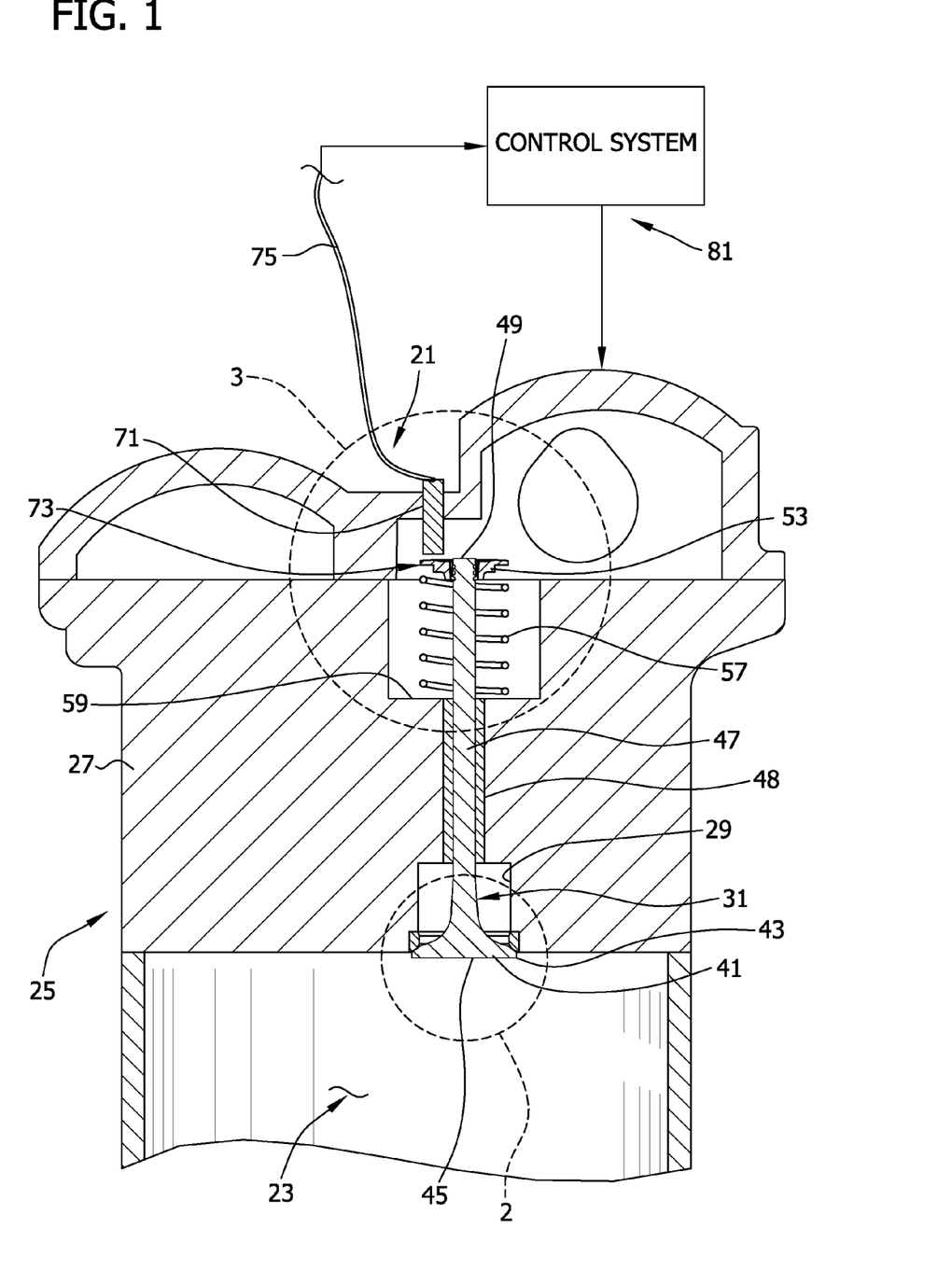
FIG. 1 is a schematic of a control system for controlling operation of an internal combustion engine, including a cross-section of a portion of the engine, a valve of the engine being illustrated in a closed position thereof.

With reference now to the drawings and in particular to FIG. 1, a monitoring system according to one embodiment for monitoring pressure in the combustion chamber of an internal combustion engine is generally indicated at 21. For purposes of describing the monitoring system 21, the system is illustrated in the various drawings herein as being used to monitor the pressure in a single combustion chamber, generally indicated at 23, of an internal combustion engine, only a portion of which is illustrated in FIG. 1 and indicated generally at 25. It is understood, though, that an engine may and often does have multiple combustion chambers, and that the monitoring system 21 described herein may be used to monitor the pressure in two or more combustion chambers of a single engine, or a plurality of the monitoring systems may be used to monitor the pressure in respective multiple combustion chambers of an engine (e.g., one monitoring system per chamber).

Figure 4:
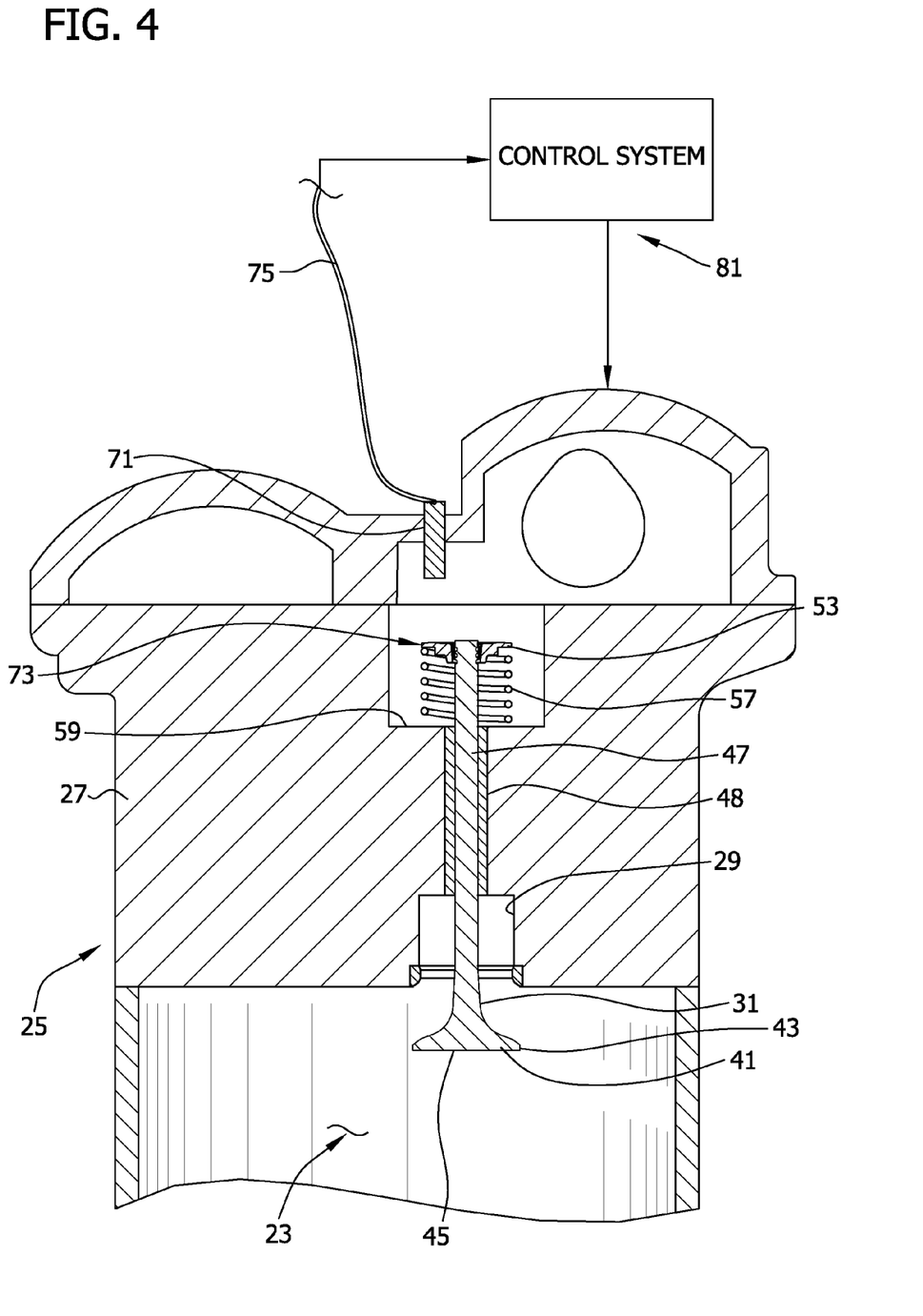
FIG. 4 is a schematic similar to FIG. 1 but with the valve in an opened position thereof.

The engine 25 generally comprises a housing, including for example a cylinder head 27 having one or more valve ports 29 (only one of which is illustrated in FIG. 1) extending there through and opening to the combustion chamber 23. A valve 31 extends axially (or longitudinally) through the valve port 29 and is positionable relative to the housing (i.e., relative to the cylinder head 27 in the illustrated embodiment) between an opened position (FIG. 4) and a closed position (FIG. 1). It is understood that more than one valve port 29 and corresponding valve 31 may be associated with each combustion chamber 23 of an engine 25 and remain within the scope of this invention. As one example, in a typical four cycle internal combustion engine there is at least one intake (e.g., induction) valve and at least one exhaust valve, each communicating with the combustion chamber and positionable intermittently between a respective opened position and closed position during the four cycles of operation.

In particular, during an intake cycle of a four-cycle engine, the piston (not shown) descends from the top of the combustion chamber (also commonly referred to as a cylinder), reducing the pressure inside the chamber. The intake valve is moved, such as by a suitable cam mechanism and corresponding linkage (not shown), to its opened position to allow air or fuel and air into the chamber and then subsequently closes as the piston passes the bottom of its stroke. Both the intake and exhaust valves remain closed during the following compression stroke as the piston moves back toward the top of the chamber. The air-fuel mixture is then ignited within the combustion chamber near the end of the compression stroke, resulting in the piston being pushed down through a power stroke (with the intake and exhaust valves still closed). In the subsequent exhaust stroke, the piston again moves back toward the top of the combustion chamber, pushing the products of combustion out of the combustion chamber through an opened exhaust valve. It is understood that the monitoring system described herein may be used other than with a four-cycle engine, such as a two-cycle engine or other suitable engine that utilizes at least one valve that opens to the combustion chamber of the engine and is thus exposed to the environment within the combustion chamber.

For further purposes of describing the operation of the monitoring system 21, only one valve 31, such as an intake valve, is illustrated in FIG. 1. The valve 31 comprises a valve head 41 disposed at an inner end 43 of the valve and having a valve face 45 exposed to the combustion chamber 23, a valve stem 47 connected to the valve head 41 and extending axially within the valve port 29 and valve guide 48 outward of the valve head to an outer end 49 of the valve disposed exterior of the combustion chamber. As used in reference to the valve 31, the terms inner and outer refer to a direction relative to the combustion chamber 23, with the inner end 43 (e.g., the valve head 41) of the valve being axially nearer to the combustion chamber (and in the illustrated embodiment it is exposed to the combustion chamber) than the outer end 49 (which in the illustrated embodiment is exterior of the combustion chamber).

Figure 2:
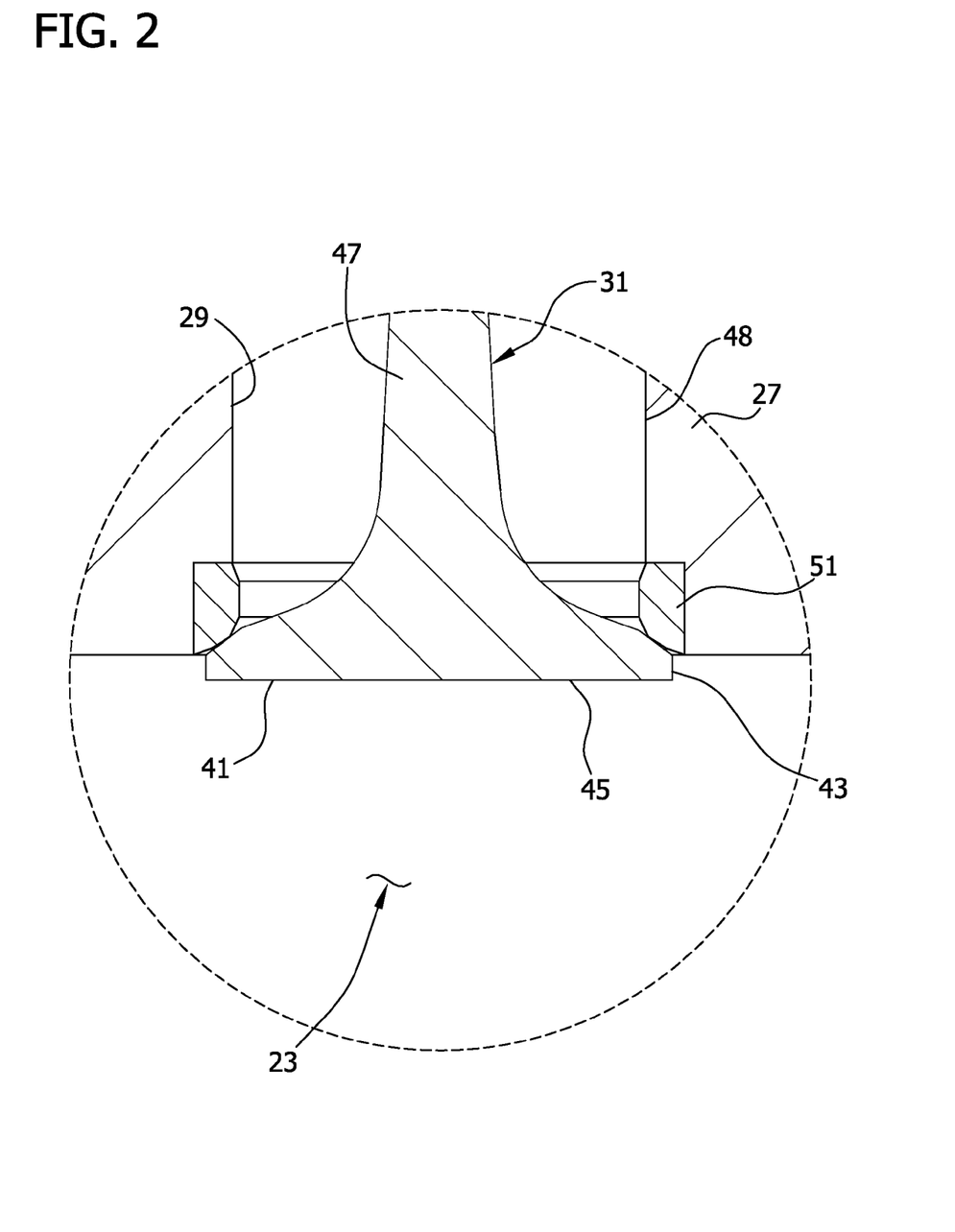
FIG. 2 is an enlarged view of area 2 of FIG. 1.

As illustrated in FIG. 2, a valve insert 51 is held by the cylinder head 27 at the inner end of the valve port 29. The outer facing surface of the valve head 41 is configured to positively seat against the valve insert 51 in the closed position of the valve to generally seal the valve port 29. It is understood that in some embodiments the valve insert 51 may be omitted, so that the valve head 41 seats instead directly against the cylinder head 27 or other suitable structure, without departing from the scope of this invention. At the outer end 49 (FIG. 3) of the valve 31, a spring retainer 53 is mounted on the valve stem 47 by a suitable valve keeper 55 for conjoint movement of the retainer with the valve axially and to retain a spring 57 (broadly, a biasing member) between the retainer and a cylinder head spring seat 59 disposed within the cylinder head such that the spring biases the valve toward its closed position.

Figure 5A:
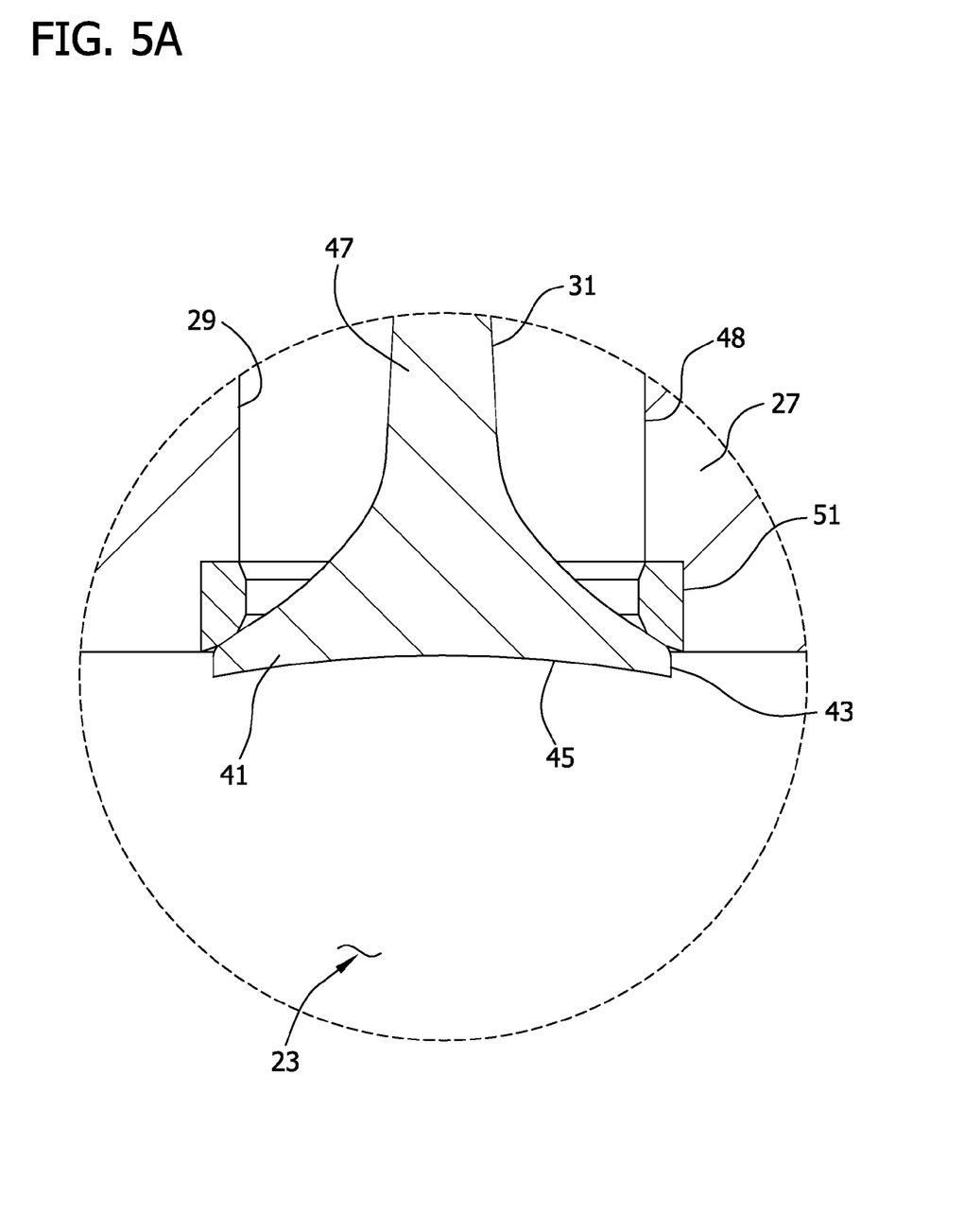
FIG. 5A is a view similar to FIG. 2 but with a valve head of the valve bent (exaggerated for illustrative purposes) due to increased combustion chamber pressure.
Figure 5B:
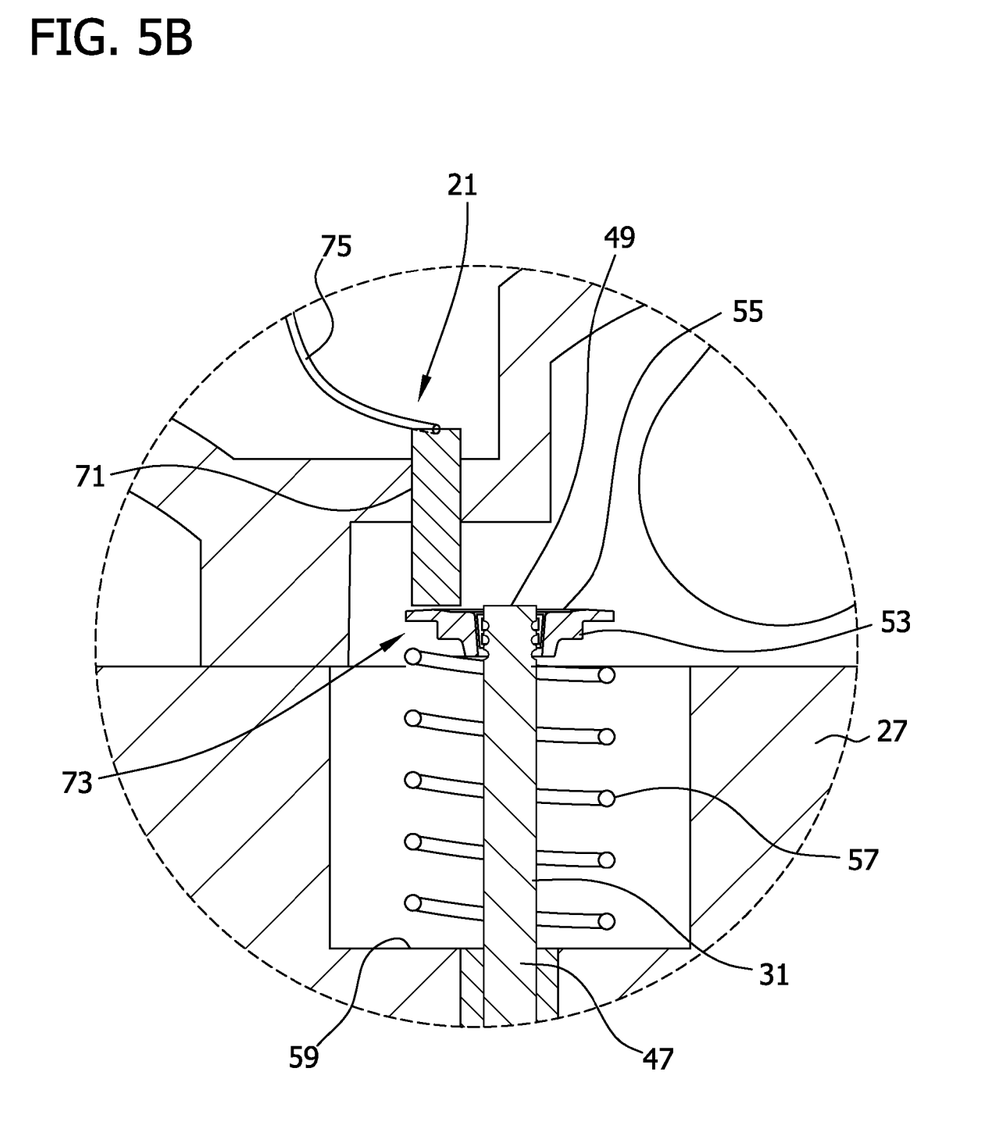
FIG. 5B is a view similar to FIG. 3 but with an outer end of the valve displaced axially outward due to the valve bending illustrated in FIG. 5A.

FIG. 5A illustrates the valve 31, and more particularly the valve head 41, in the closed position of the valve during a period of increased pressure in the combustion chamber 23, such as during a compression stroke or power stroke of the engine. The substantial pressure acting outward against the face 45 of the valve head 41 while the valve 31 is closed has been found to cause the valve head to bend slightly (e.g., so that the face of the valve head becomes generally concave), such as on the order of thousandths of an inch. This bending of the valve head 41 results in the valve stem 47, retainer 53 and any structure associated with the valve 31 (i.e., structure that is sufficiently connected or secured to the valve for conjoint axial movement therewith) to move axially outward relative to the cylinder head 27.

With reference back to FIG. 1, the monitoring system 21 in accordance with this embodiment is suitably configured to monitor the displacement of the valve 31 axially, particularly while the valve is in its closed position. More suitably, the monitoring system 21 comprises a sensor 71 that is operable to sense this axial valve movement and to generate data indicative of such valve movement. For example, in the illustrated embodiment the sensor 71 comprises a proximity sensor, such as an inductive proximity sensor or a capacitive proximity sensor, mounted on suitable engine structure (e.g., in the illustrated embodiment, to the engine housing) that remains relatively stationary compared to the valve 31 and is exterior of the combustion chamber 23.

Figure 3:
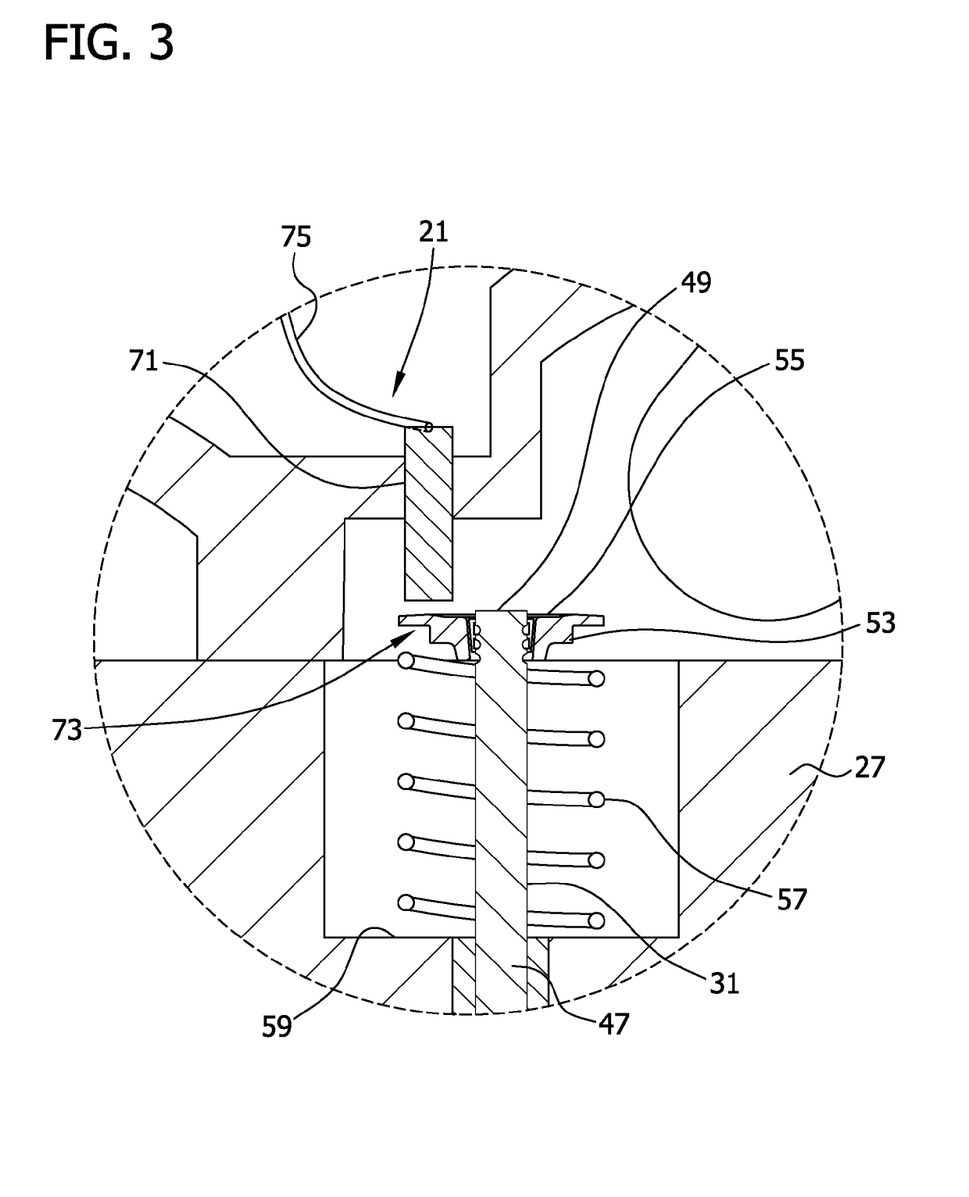
FIG. 3 is an enlarge view of area 3 of FIG. 1.

The sensor 71 is suitably positioned in opposed relationship with a suitable target structure, indicated generally at 73, that is associated with the valve 31 (i.e., the target structure moves conjointly with the valve). For example, in the illustrated embodiment the sensor 71 is suitably opposed to the retainer 53 at the outer end 49 of the valve 31 as illustrated in FIGS. 1 and 3 such that the retainer broadly defines the target structure 73 for the sensor. It is understood, however, that the target structure 73 may be other than the retainer 53 without departing from the scope of this invention, as long as the target structure is conjointly moveable with the valve 31 upon exposure of the valve to the combustion chamber 23 pressure.

The illustrated sensor 71 is spaced from the sensor target structure 73 a distance sufficient to allow for movement of the valve 31 axially while the valve is closed and subjected to increased combustion chamber pressure, but sufficiently near the retainer 53 to accurately monitor the displacement of the valve 31. As one example, the proximity sensor 71 may be suitably spaced from the retainer 53 (broadly, the target structure 73) a distance in the range of about 0.015 inches to about 0.02 inches when the valve 31 is closed but otherwise under no pressure (i.e. so that it is not bent—such as is illustrated in FIG. 1). It is understood, however, that the spacing between the proximity sensor 71 and the target structure 73 may be other than in this range depending at least in part on the particular proximity sensor being used and on the expected range of movement of the valve 31 while it is closed.

It is also understood that the cylinder head 27, on which the valve 31 is mounted, is also exposed to the increased pressure in the combustion chamber 23 when the valve is closed and may move or otherwise experience outward movement axially under such pressure. Thus, the outward valve movement axially monitored by the monitoring system 21 may be due to a combination of the cylinder head 27 moving and the valve 31 bending upon experiencing increased combustion chamber pressure when the valve is closed, or due to bending of the valve only (e.g., if the cylinder head 27 does not move due to increased combustion chamber pressure), or due to outward movement of the valve as a result solely of the cylinder head moving axially outward.

In one example, a suitable proximity sensor is available from Kaman Aerospace of Bloomfield, Conn., USA as model KD 2300. It is understood, through, that any suitable proximity sensor 71 may be used without departing from the scope of this invention. It is also contemplated that any suitable sensor 71 other than a proximity sensor may be used to monitor movement (e.g., bending) of the valve 31 (from exterior of the combustion chamber 23) while the valve is closed and subjected to combustion chamber pressure. For example, a sensor that measures the resistance or capacitance of a thin oil film between the outer end of the valve (e.g., the retainer) and a suitable opposing surface (not shown) may be used, as is common in measuring bearing clearances. Alternatively, a sensor (not shown) may be used which contacts the valve structure.

Suitable wiring 75 connects the proximity sensor 71 to a source of current (not shown), such as from a stationary source or more suitably from a vehicle (not shown, e.g., an automobile, truck, boat, tractor, etc.) on which the engine 25 is installed. The monitoring system 21 generates data indicative of the valve 31 movement. For example, the proximity sensor 71 suitably generates voltage data that corresponds with the displacement of the valve 31 (and in particular of the target structure). The proximity sensor 71 may convert this voltage data to valve displacement data, or a separate device that communicates with the proximity sensor may convert the voltage data to valve displacement data.

The monitoring system 21, in one embodiment, communicates (e.g., either by suitable wiring or by wireless communication) with an engine control system, indicated generally at 81, to provide data indicative of the valve 31 movement to the engine control system at least when the valve is closed and under increased combustion chamber pressure. The data may be voltage data, displacement data or other data indicative of the valve 31 movement. The engine control system 81 is configured to determine, based on the received data, the combustion chamber 23 pressure. For example, the data generated by the monitoring system 21 may be calibrated to combustion chamber 23 pressure (e.g., when the valve 31 is closed) and a relationship therebetween determined and programmed into the control system.

It is understood that the monitoring system 21 may communicate with any suitable system separate from the control system 81 and operable to determine the combustion chamber pressure based at least in part on the data generated by the monitoring system. Such a system may be part of the monitoring system 21, or even integral therewith, or it may be separate from the monitoring system.

The engine control system 81 may use the determined combustion chamber 23 pressure, such as in the manner of a closed loop feedback control system, to at least in part control one or more operating parameters of the engine. Variable engine control based on combustion chamber pressure is generally known to those skilled in the art. One such system is described, for example, in a publication entitled *Cylinder Pressure-Based Control of Pre-Mixed Diesel Combustion*, by Husted, Kruger, Fattic, Ripley and Kelly, SAE International, 2007 (2007-01-0773). However, other control systems that utilize combustion chamber 23 pressure to at least in part control one or more engine operating parameters may be used with the monitoring system 21 and remain within the scope of this invention.

In operation, the sensor 71 is located at a known distance from the target structure 73 with the spacing therebetween corresponding to the position of the target structure when the valve 31 is closed but otherwise not subjected to combustion chamber pressure sufficient to bend the valve head 41 and/or cylinder head 27. During engine operation, including while a vehicle on which the engine 25 is installed is moving under power of the engine, the valve 31 is operated by the cam mechanism to move between its closed and opened positions in accordance with the engine operation. When the valve 31 is in its closed position, such as during a compression stroke and/or a power stroke of the engine 25, pressure in the combustion chamber 23 acts against the valve head 41 and cylinder head 27. The valve head 41 and/or the cylinder head 27 is urged outward relative to the combustion chamber 23 by this pressure such that the target structure 73 moves relative to the sensor 71.

The sensor 71 intermittently generates data, such as voltage data or other suitable data, indicative of the target structure 73 (i.e., valve 31 and more particularly the retainer 53 in the illustrated embodiment) position (and hence displacement) relative to the sensor. Thus, upon movement of the valve 31 and/or cylinder head 27 due to combustion chamber 23 pressure, the sensor 71 will output data that indicates such movement. The data is received by the control system 81, which determines the pressure in the combustion chamber 23 based on the data received from the sensor 71. The control system 81 then determines whether adjustments to one or more operating parameters of the engine 25 are needed, based on the determined combustion chamber 23 pressure, and then implements such adjustments.

Experiment 1

An experiment was conducted to assess the relationship between valve bending and combustion chamber pressure in an internal combustion engine. In this experiment, an aluminum 4-cylinder head with two 28 mm intake valves and two 26 mm exhaust valves per cylinder for an 82 mm bore engine was fitted with a 38 mm thick aluminum pressure plate. The pressure plate was clamped onto the head with the head gasket using the cylinder head bolts and an injector was installed to create a small pressure chamber on the combustion face of the cylinder head. The pressure plate was then connected to a hydraulic pressure pump which supplied oil pressure to the combustion face of the cylinder head to simulate combustion pressure.

Figure 6:
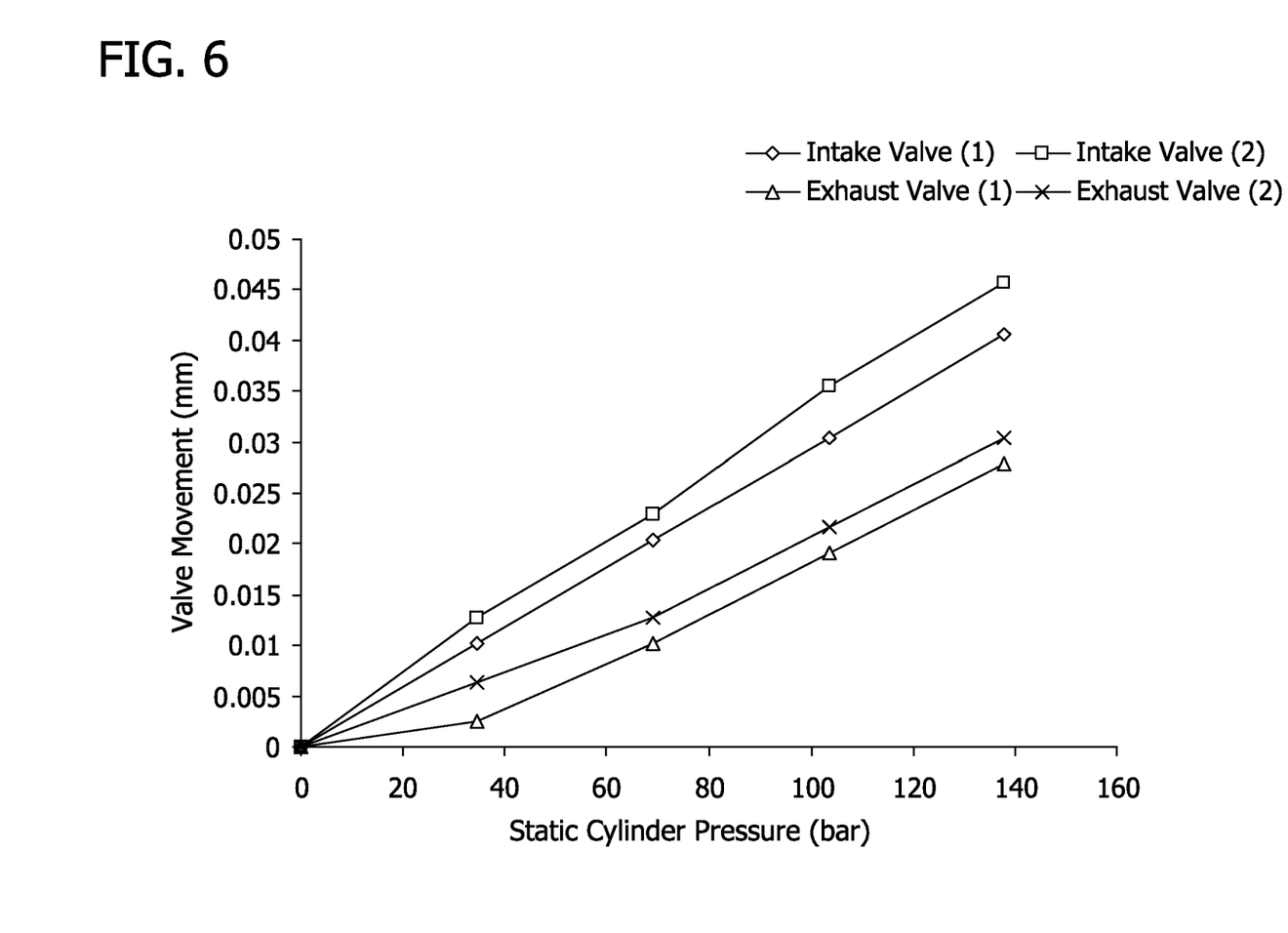
FIG. 6 is a data plot of valve displacement versus simulated combustion chamber pressure for an experiment that was conducted.

Valve stem movement was monitored by a dial indicator that could measure $2.5 \times E^{-3}$ mm movement for a range of simulated combustion pressure (as determined using an oil pressure gage). The data is plotted in FIG. 6 for each of the intake and exhaust valves. The data shows good linearity between valve movement and simulated combustion chamber pressure and was limited only by the accuracy of reading the dial indicator and the oil pressure gage.

The above data was used to identify a sensor that could measure valve movement accurately to within 1% of the maximum valve movement or $2.5 \times E^{-5}$ mm. Several sensors were considered which could have accuracy in this range and an eddy current (proximity) sensor was chosen since the sensor was readily available. The specs for this sensor are as follows:

| | |
|---|---|
| Sensor Type: | Kaman KD-2300-1sm |
| Measuring Range: | 0.05 mm-1.05 mm |
| Nonlinearity: | 1% (0.4% at sensor midrange) |
| Static resolution: | 0.000001 mm (at midrange) |
| Sensitivity: | 20-1000 mV/mm (at midrange) |
| Thermal sensitivity: | 0.15% FSO/° C. |
| | 0.03% FSO/° C. with temp compensation |

Frequency Response: Static to 50 kHz (−3 dB pt.)

The Kaman sensor was then mounted in a block that could be adjusted over the valve spring retainers of the aluminum 4-cylinder head and the sensor clearance to the valve retainer was adjusted to approximately 0.5 mm, which is where the sensor has its best linearity.

The valves on the 4-cylinder head have multiple-bead valve keys or keepers which butt together and allow the valves to rotate for better valve temperature distribution. Since these keys allow the valve spring retainer to move relative to the valve stem, one of the intake valves was modified to fix the valve spring retainer to the valve stem to improve stability.

Figure 7:
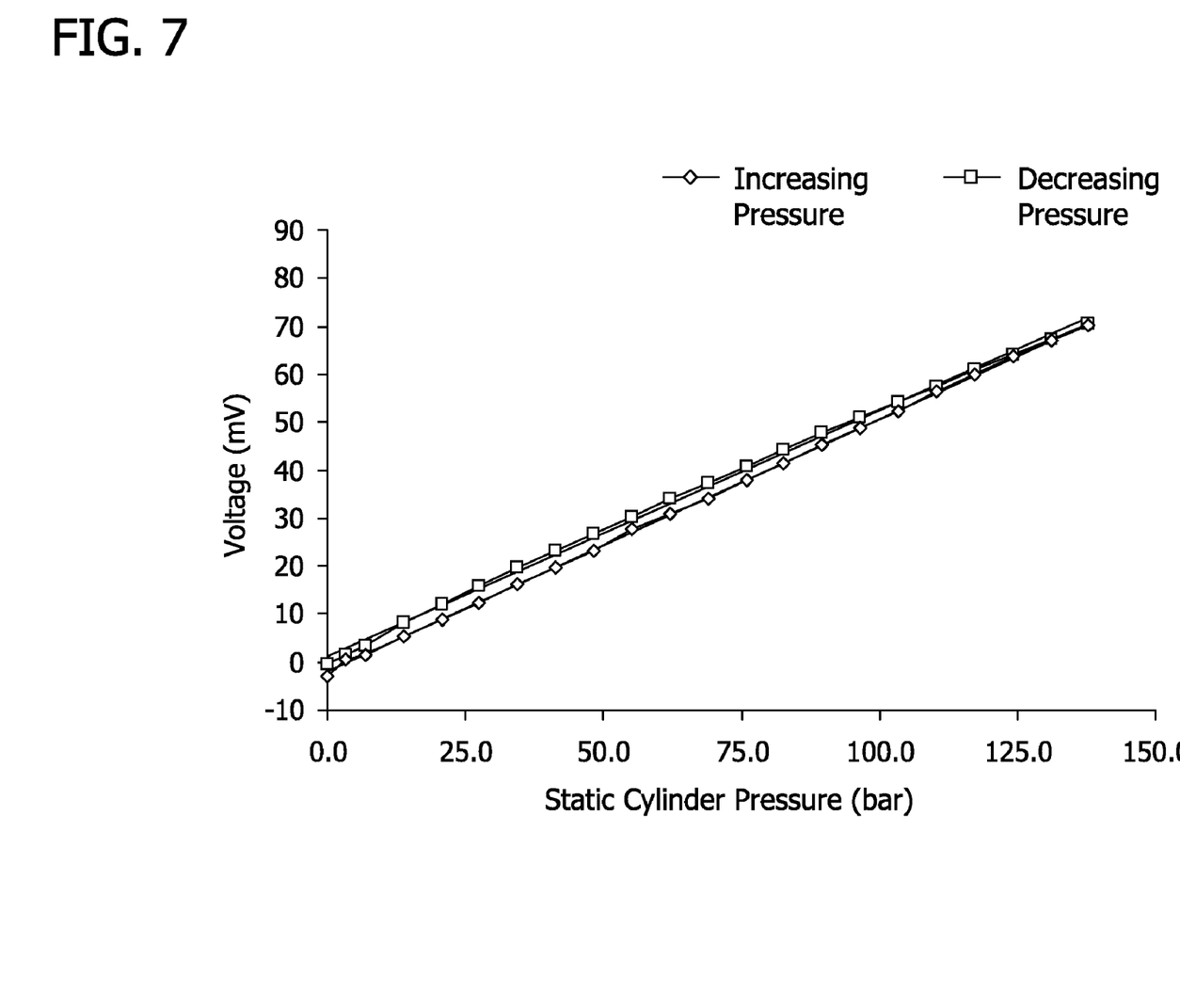
FIG. 7 is a data plot of sensor output data versus simulated combustion chamber pressure for an experiment that was conducted.
Figure 8:
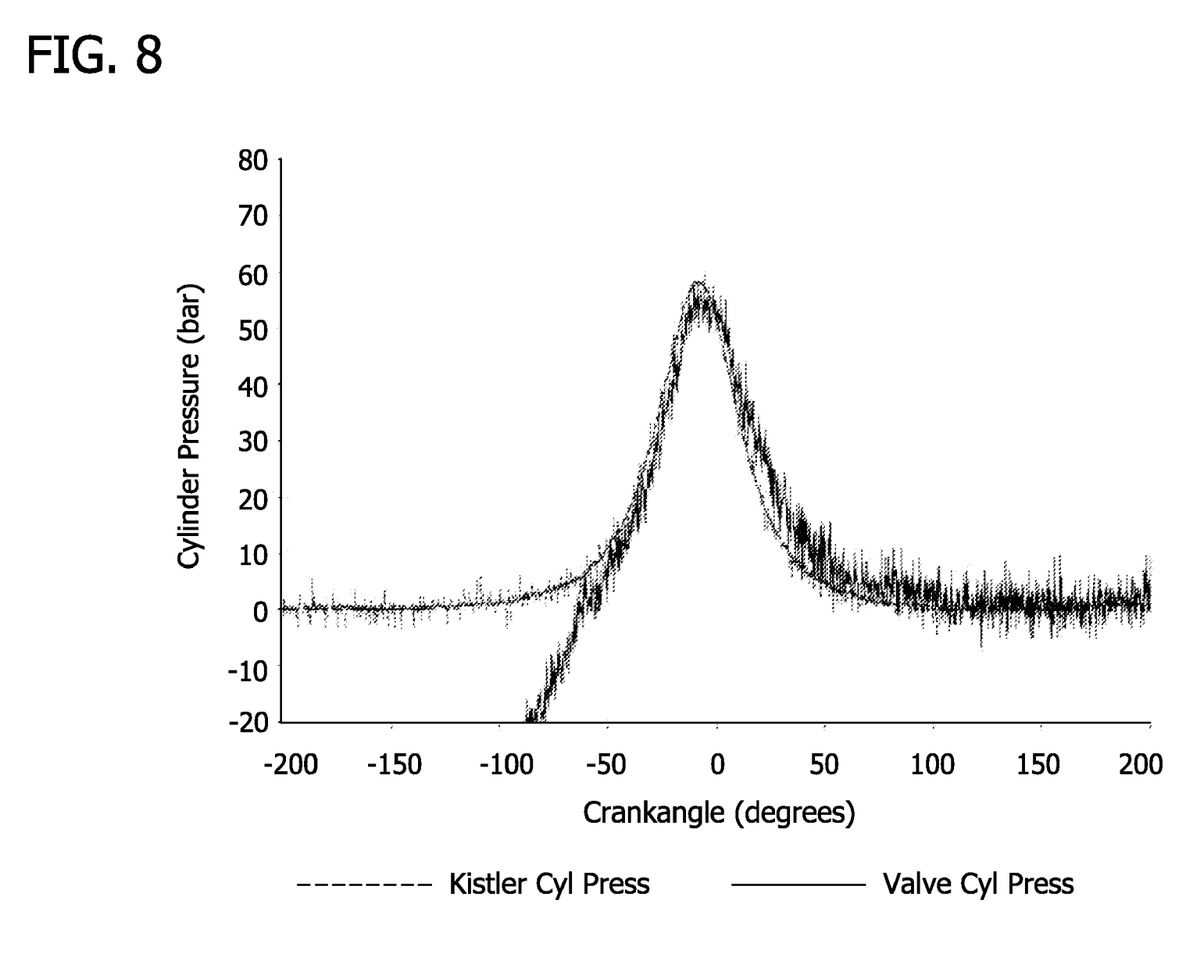
FIG. 8 is a data plot of sensor output data and combustion chamber pressure transducer data versus crank angle for another experiment that was conducted.

A dead weight pressure tester was used in combination with the hydraulic oil pump discussed above to provide an accurate pressure for checking the sensor operation and the test was performed again over a range of simulated combustion chamber pressure. FIG. 7 is a plot of the voltage output of the sensor versus simulated static combustion chamber pressure by applying hydraulic oil pressure to the cylinder head combustion face. As can be seen from the plot, output from the sensor is very linear with the simulated static combustion chamber pressure. The $R^2$ for the data is very high with it being over 0.999 when increasing pressure and 0.99 when decreasing pressure. The pressure is not as linear with decreasing pressure most likely due to scrubbing action of the valve face with the valve seat.

Experiment 2

A bracket was made to install the Kaman sensor from the above Experiment onto a single cylinder engine that used the same aluminum 4-cylinder head. This bracket allowed the sensor to be adjusted to the optimum clearance for maximum linearity of the sensor. This engine also had a 6125B Kistler combustion chamber pressure transducer installed that could be compared to the output of the Kaman KD-2300-1sm sensor. The engine was motored at different speeds and data for the Kistler pressure and the valve sensor voltage measurements were recorded with a Tektronix TDS2014B oscilloscope and with a National Instruments 6110 high speed DAQ board. The recorded signals were then adjusted for calibration factors and pegged to intake pressure.

FIG. 3 is a data plot of the results of a motoring test conducted at 1500 rpm. It can be seen from the plot that the valve bending data (i.e., the voltage data) follows the Kistler pressure data (i.e., the combustion chamber pressure data) quite well between −50 deg and 200 deg crank angle. The most likely cause of the deviation of valve bending measurements at crank angles less than −50 deg is that the intake valve has not totally seated and is still being slowly closed by the valve seating ramp of the camshaft.

Typically, cylinder pressure would be pegged to intake pressure somewhere between −180 and −150 deg. crank angle. Since the valve bending data deviates in this crank angle range, there are several options to compensate for this deviation, such as changing the ramp, using the ideal gas law to calculate the pressure when the valve is full seated, using the exhaust stroke to peg the pressure or measuring exhaust valve bending instead of intake valve bending. It was also seen that between 0 and 50 deg that the valve bending results are slightly higher than the Kistler pressure data. This deviation is consistent with the static results obtained in Experiment 1 and again is most likely a result of the interaction of the valve face and the valve seat.

When introducing elements of the present invention or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A monitoring system for monitoring pressure in a combustion chamber of an internal combustion engine, the engine having a combustion chamber and a valve including a valve head in communication with the combustion chamber, at least a portion of the valve being disposed exterior of the combustion chamber, said valve being operable between an opened position and closed position, said monitoring system comprising:
   a sensor operable to sense movement of the valve while the valve is in its closed position, the sensor generating data indicative of said sensed movement of the valve; and
   a system in communication with the sensor to receive said data indicative of said sensed movement of the valve in the closed position thereof, said system being operable to quantify the pressure in the combustion chamber based at least in part on said sensed movement of the valve.

2. The monitoring system set forth in claim 1 wherein the sensor is disposed exterior of the combustion chamber.

3. The monitoring system set forth in claim 1 wherein the valve has an outer end exterior of the combustion chamber and a valve stem interconnecting the valve head and the outer end of the valve, the sensor being operable to sense movement of the outer end of the valve while the valve is in its closed position.

4. The monitoring system set forth in claim 3 wherein the sensor is operable to sense axial movement of the outer end of the valve while the valve is in its closed position.

5. The monitoring system set forth in claim 1 wherein the sensor comprises a proximity sensor, the valve having a target structure associated therewith for conjoint movement with the valve at least in the closed position of the valve, the sensor being in opposed, spaced relationship with the target structure.

6. The monitoring system set forth in claim 1 wherein said system is operable to quantify the pressure in the combustion chamber intermittently during a compression stroke of the internal combustion engine.

7. The monitoring system set forth in claim 1 wherein the valve is an intake valve.

8. The monitoring system set forth in claim 1 wherein the sensor is capable of sensing valve movement within about $2.5 \times E^{-5}$ mm.

9. The monitoring system set forth in claim 1 in combination with an internal combustion engine.

10. The combination set forth in claim 9 wherein the internal combustion engine comprises a cylinder head having a valve port for allowing the valve to extend through the cylinder head, the valve port having a valve guide disposed within the valve port.

11. A system for controlling operation of an internal combustion engine, the engine having a combustion chamber and a valve including a valve head in communication with the combustion chamber, at least a portion of the valve being disposed exterior of the combustion chamber, said valve being operable between an opened position and closed position, the control system comprising:
- a valve sensor operable to sense movement of the valve while the valve is in its closed position, the sensor generating data indicative of said sensed movement of the valve; and
- a control system in communication with the sensor to receive said data indicative of said sensed movement of the valve in the closed position thereof, the control system being operable to quantify the pressure in the combustion chamber based at least in part on said sensed movement of the valve, said control system being further operable to adjust operation of the engine based at least in part on the pressure in the combustion chamber.

12. The system set forth in claim 11 wherein the valve sensor is disposed exterior of the combustion chamber.

13. The system set forth in claim 11 wherein the valve has an outer end exterior of the combustion chamber and a valve stem interconnecting the valve head and the outer end of the valve, the sensor being operable to sense movement of the outer end of the valve while the valve is in its closed position.

14. The system set forth in claim 13 wherein the sensor is operable to sense axial movement of the outer end of the valve while the valve is in its closed position.

15. The system set forth in claim 11 wherein the sensor comprises a proximity sensor, the valve having a target structure associated therewith for conjoint movement with the valve at least in the closed position of the valve, the sensor being in opposed, spaced relationship with the target structure.

16. The system set forth in claim 11 wherein the control system is operable to quantify the pressure in the combustion chamber intermittently during a compression stroke of the internal combustion engine.

17. A method for determining the pressure in the combustion chamber of an internal combustion engine, the engine having a combustion chamber and a valve including a valve head in communication with the combustion chamber, at least a portion of the valve being disposed exterior of the combustion chamber, said valve being operable between an opened position and closed position, the method comprising;
- sensing movement of the valve while the valve is in its closed position; and
- quantifying the pressure in the combustion chamber based at least in part on the sensed movement of the valve.

18. The method set forth in claim 17 further comprising locating the sensor exterior of the combustion chamber.

19. The method set forth in claim 18 wherein the locating step comprises locating a proximity sensor in opposed relationship with a target structure, the target structure being associated with the valve for conjoint movement therewith while the valve is in its closed position, the sensing step comprising operating the sensor to generate data indicative of movement of the valve in the closed position of the valve.

20. The method set forth in claim 17 wherein the valve has an outer end exterior of the combustion chamber and a valve stem interconnecting the valve head and the outer end of the valve, the sensing step comprising sensing movement of the outer end of the valve while the valve is in its closed position.

21. The method set forth in claim 20 wherein the sensing step comprises sensing axial movement of the valve while the valve is in its closed position.

22. The method as set forth in claim 17 wherein quantifying the pressure in the combustion chamber comprises quantifying the pressure in the combustion chamber intermittently during a compression stroke of the internal combustion engine.

23. A method for controlling operation of an internal combustion engine, the engine having a combustion chamber and a valve including a valve head in communication with the combustion chamber, at least a portion of the valve being disposed exterior of the combustion chamber, said valve being operable between an opened position and a closed position, the method comprising;
- sensing movement of the valve while the valve is in its closed position;
- quantifying the pressure in the combustion chamber based at least in part on the sensed movement of the valve; and
- adjusting at least one operating parameter of the engine based at least in part on the pressure in the combustion chamber.

24. The method set forth in claim 23 further comprising locating the sensor exterior of the combustion chamber.

25. The method set forth in claim 24 wherein the locating step comprises locating a proximity sensor in opposed relationship with a target structure, the target structure being associated with the valve for conjoint movement therewith while the valve is in its closed position, the sensing step comprising operating the sensor to generate data indicative of movement of the valve in the closed position of the valve.

26. The method set forth in claim 23 wherein the valve has an outer end exterior of the combustion chamber and a valve stem extending between and interconnecting the valve head and valve outer end, the sensing step comprising sensing movement of the outer end of the valve while the valve is in its closed position.

27. The method set forth in claim 26 wherein the sensing step comprises sensing axial movement of the valve while the valve is in its closed position.

28. The method as set forth in claim 23 wherein quantifying the pressure in the combustion chamber comprises quantifying the pressure in the combustion chamber intermittently during a compression stroke of the internal combustion engine.

* * * * *